United States Patent
Ganguin et al.

(10) Patent No.: US 11,953,859 B2
(45) Date of Patent: Apr. 9, 2024

(54) SIMULTANEOUS FORCE AND DISTANCE MEASURING DEVICE, IN PARTICULAR FOR FITTING OUT A TIMEPIECE COMPONENT

(71) Applicant: ETA SA Manufacture Horlogère Suisse, Grenchen (CH)

(72) Inventors: Fabrice Ganguin, Moutier (CH); Erich Welz, Courrendlin (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 18/252,734

(22) PCT Filed: Oct. 22, 2021

(86) PCT No.: PCT/EP2021/079385
§ 371 (c)(1),
(2) Date: May 12, 2023

(87) PCT Pub. No.: WO2022/135768
PCT Pub. Date: Jun. 30, 2022

(65) Prior Publication Data
US 2023/0418235 A1    Dec. 28, 2023

(30) Foreign Application Priority Data

Dec. 21, 2020 (EP) ..................................... 20216203

(51) Int. Cl.
*G04D 3/04* (2006.01)
*G01B 5/02* (2006.01)
*G04B 31/06* (2006.01)

(52) U.S. Cl.
CPC ............... *G04D 3/042* (2013.01); *G01B 5/02* (2013.01); *G04B 31/06* (2013.01)

(58) Field of Classification Search
CPC .................................. G04D 3/042; G01B 5/02
See application file for complete search history.

(56) References Cited

U.S. PATENT DOCUMENTS

| 1,528,872 | A | * | 3/1925 | Colomb | G04D 3/042 |
| | | | | | 384/243 |
| 2,071,401 | A | * | 2/1937 | Hansen | G04D 3/042 |
| | | | | | 968/736 |
| 2002/0071349 | A1 | * | 6/2002 | Durand | G04D 3/04 |
| | | | | | 368/327 |

OTHER PUBLICATIONS

International Search Report dated Jan. 18, 2022 in PCT/EP2021/079385 filed on Oct. 22, 2021, 1 page.

(Continued)

*Primary Examiner* — Jason L Vaughan
*Assistant Examiner* — Amanda Kreiling
(74) *Attorney, Agent, or Firm* — Oblon, McClelland, Maier & Neustadt, L.L.P.

(57) ABSTRACT

A combined device applies an axial force to a timepiece component, and simultaneously measures the axial distance between a reference and a surface of the component. The device includes a support carrying a measuring body which includes a measuring unit for carrying out an axial measurement of the position of this surface, and a controller operated by a user or by an automated manipulator, for applying to this surface, a characterised axial force transmitted to the bearing and measuring point by a calibrated axial resilient return device. The device is used by having a stack of flat, specific resilient elements, which are characterised by the combined force characteristic thereof as a function of the applied axial stroke, impart to the controller the rotational or axial stroke which corresponds to the specific axial force to be applied.

24 Claims, 7 Drawing Sheets

(56) References Cited

OTHER PUBLICATIONS

Sysmelec SA, "Empierrage de haute precision", Bulletin SSC, No. 60, XP-001551355, May 31, 2009, 3 pages.
Bourgeois, F., "Vers la Maitrise de la Qualite des Assemblages de Precision", Ecole Polytechnique Federale de Lausanne, 2007, 25 Pages.

* cited by examiner

SIMULTANEOUS FORCE AND DISTANCE MEASURING DEVICE, IN PARTICULAR FOR FITTING OUT A TIMEPIECE COMPONENT

CROSS-REFERENCE TO RELATED APPLICATIONS

The present application is a national stage entry of International Application No. PCT/EP2021/079385, filed Oct. 22, 2021, which claims priority to European Patent Application No. 20216203.8, filed on Dec. 21, 2020, the entire content and disclosure of which are incorporated by reference herein.

TECHNICAL FIELD OF THE INVENTION

The invention relates to a device for applying an axial force to a timepiece component, and for simultaneously measuring the axial distance between a reference and a surface of said component, in particular for fitting out a timepiece, said device including a support carrying at least one measuring body which includes at least one measuring means arranged to carry out an axial measurement of the position of a said surface of a timepiece component, in an axial direction, which measuring means includes a feeler-spindle in contact with a bearing and measuring point and aligned therewith in said axial direction.

The invention further relates to a method for using such a measuring device.

The invention relates to the timepiece production field, and in particular to in-shop assembly and metrology.

TECHNOLOGICAL BACKGROUND

Within the scope of the step of fitting jewels in timepiece components, the strength of fit thereof (maximum displacement in the order of 2 micrometres) must be guaranteed for a given force, to ensure that blanks from the same family are interchangeable.

This determination is commonly made using, in succession, a distance sensor, based on the use of a feeler-spindle bearing against the surface of a jewel, and a force emitter exerting a calibrated axial force on this jewel, this force emitter being provided with a force sensor, before reusing the distance sensor to check that the maximum depression of this jewel in the timepiece component thereof is within the tolerances.

Another possibility for assessing the strength of fit of the jewels is to use motor-driven force-distance measuring devices. This alternative is mainly used in a laboratory and in some cases in production. However, this solution is more complex to implement, is slower when measuring multiple positions and is more expensive.

XP1551355A discloses a machine for pressing in mechanical parts and comprising a jewel press bench and a blank press bench configured to press a jewel into a plate. This machine further comprises a jewel feeler-spindle and a plate feeler-spindle configured to measure the relative position between a jewel and a support prior to using the blank press to locally pre-stress the support. The machine disclosed by XP1551355A thus combines the application of a force with the measurement of the displacement of the surface to which this force is applied.

SUMMARY OF THE INVENTION

In order to avoid a laborious measuring method with either of the aforementioned solutions, the invention proposes combining, by a simple principle, the two measuring elements (force and distance) in a single assembly, in order to do away with the need for multiple handling operations for a timepiece component.

Determining the strength of fit of jewels is thus less complex and less expensive.

To this end, the invention relates to a device for simultaneously measuring force and distance for fitting out a timepiece, according to claim 1.

Another aspect of the invention relates to a method for using such a measuring device, according to claim 21.

BRIEF DESCRIPTION OF THE FIGURES

Other features and advantages of the invention will be better understood upon reading the following detailed description given with reference to the accompanying drawings, in which.

DETAILED DESCRIPTION OF THE INVENTION

The invention relates to a device 100 for applying an axial force to a timepiece component, and for simultaneously measuring the axial distance between a reference and a surface 10 of this component.

The invention, which was developed to control the fitting out of a timepiece, can be used for any precision operation that requires a force to be applied to a component, and the maintenance or drift of the axial position of this component to be verified during or after the application of this force. It is thus of interest for many precision engineering applications, in particular in the watchmaking industry.

This device 100 includes a support 1, which is as rigid as possible, carrying at least one measuring body 2. This measuring body 2 includes at least one measuring means 3, which is arranged to carry out an axial measurement of the position of such a surface 10 of a timepiece component, in an axial direction A, relative to a reference surface, such as a table included in the support 1, or the like. This measuring means 3 includes a feeler-spindle 4, which is in contact with a bearing and measuring point 5 or in the vicinity thereof in the case of an inductive connection or the like, and which is aligned therewith in this axial direction A.

According to the invention, the device 100 is a combined device for simultaneously applying a force and measuring the displacement of the surface to which this force is applied. To this end, the device 100 includes at least one control means 6, which is arranged to be operated by a user or by an automated manipulator 7, in order to apply to a surface 10, a characterised axial force transmitted to said bearing and measuring point 5 by at least one calibrated axial resilient return means 9. The term "characterised axial force" is understood to mean that all of the resilient return means 9 obey a force/stroke characteristic which is reproducible: thus each applied stroke always corresponds to the same force.

Advantageously, the composition of the resilient return means 9 is modular, allowing for the use of particular ranges of force, which are suitable for the intended applications. For example, for fitting out watch components by pressing jewels into bores, resilient return means 9 covering a range from 0 to 40 N, and more particularly from 2 N to 40 N are chosen for pressing timepiece jewels in the vast majority of cases. However, it is equally possible to choose to cover limited ranges, for example 15 to 25 N. In each case, a stroke imposed on the control means 6, which can be identified by a graduated scale, a notch, or the like, provides a guarantee to the user that the force read opposite this stroke on the characteristic curve is applied.

The control means 6 is more particularly arranged to drive a bearing ring 8 through a motion in the axial direction A, and to modify the axial force exerted by the bearing ring 8, in this axial direction A, on this at least one axial resilient return means 9, which is arranged to transmit, to the bearing and measuring point 5, an axial force proportional to the axial stroke of the bearing ring 8.

In the advantageous alternative embodiment illustrated by the figures, the control means 6 is arranged to be driven in rotation, and takes, for example, the form of a fluted ring, and includes at least one driver 61, which is arranged to follow an oblique or substantially helical groove 26 provided in the body 2, and to drive the bearing ring 8 at least in translation in the axial direction A. This bearing ring 8 includes, in the axial direction A, a thread 82, or respectively a tapping, cooperating with a tapping 22, or respectively a thread, comprised in the body 2. Similarly, the control means 6 includes a tapping 68, or respectively a thread, cooperating with a thread 28, or respectively a tapping, comprised in the body 2. In the non-limiting alternative embodiment illustrated in the figures, the control means 6 is a ring, which can be rotated into a predetermined position to gradually apply the required force.

Figure 3:
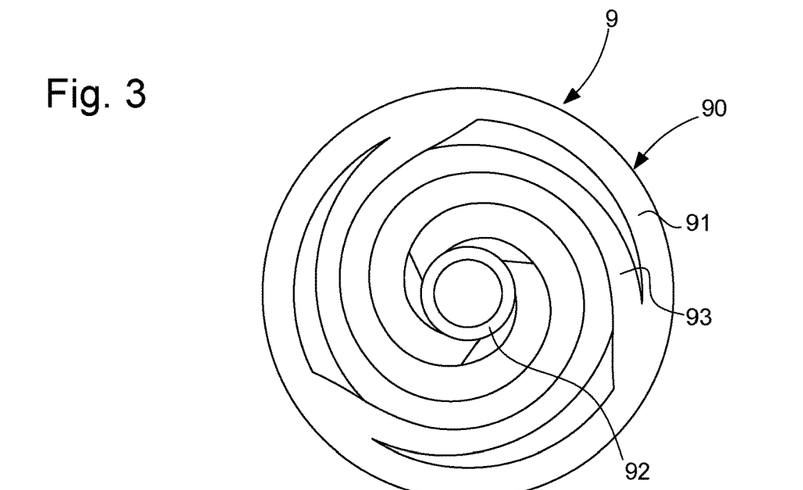
FIG. 3 diagrammatically shows a plan view of such a circular, resilient element including spirally-wound arms.
Figure 4:
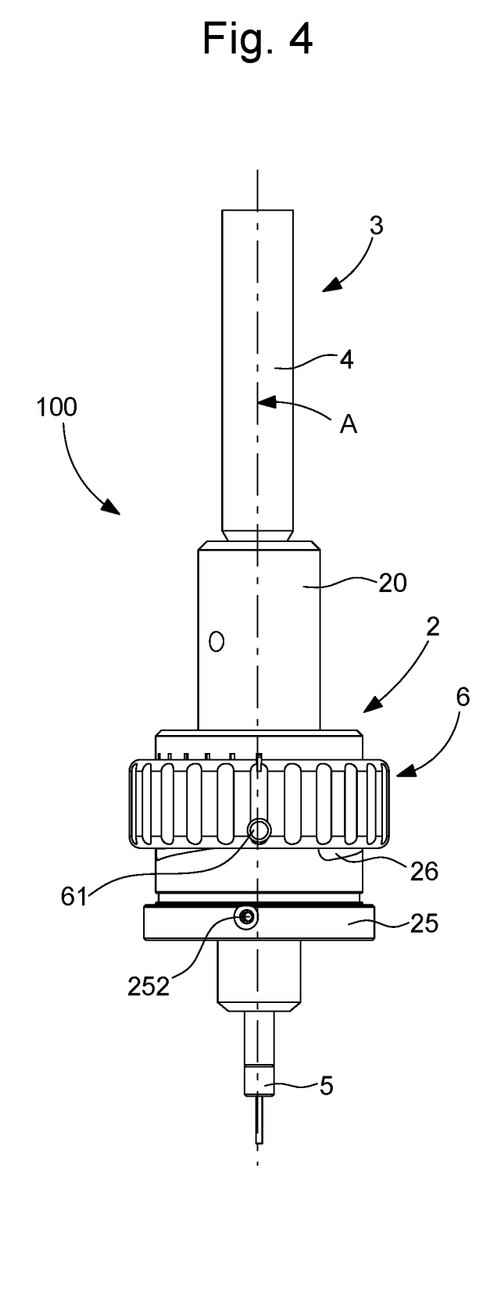
FIG. 4 diagrammatically shows an elevation view of the measuring body of another alternative embodiment of such a device, wherein the outer ring includes drivers, each of which is capable of moving within a helical groove in the body.
Figure 5:
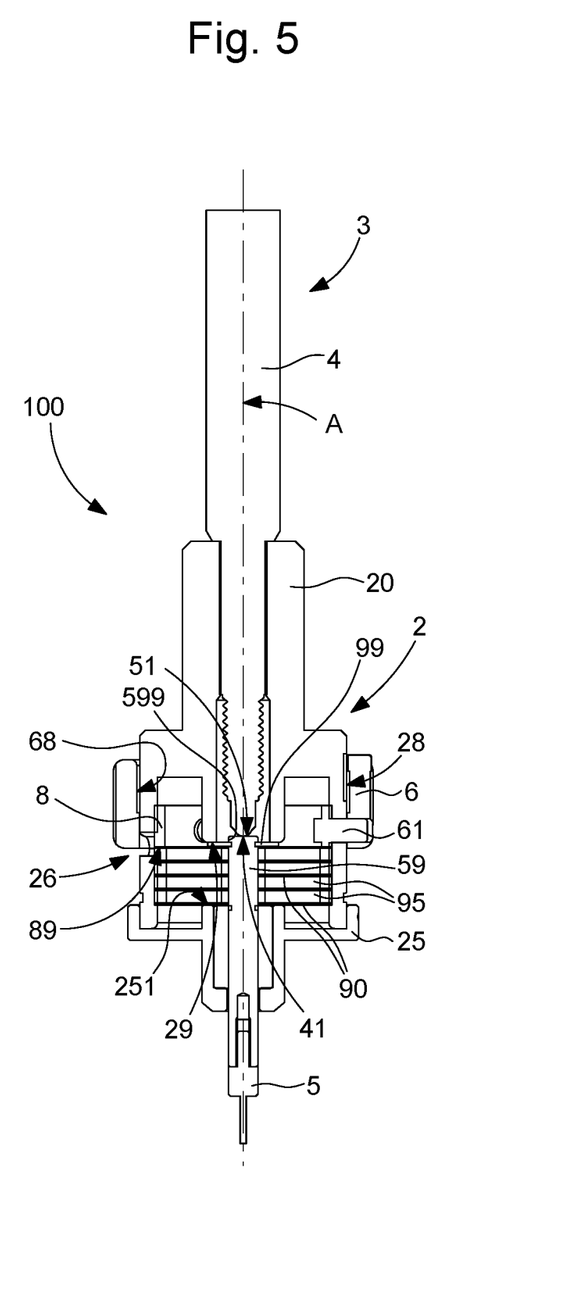
FIG. 5 diagrammatically shows a sectional view of the measuring body in FIG. 4 in a rest position wherein the stack of resilient elements bears against a banking surface of an upper body.
Figure 6:
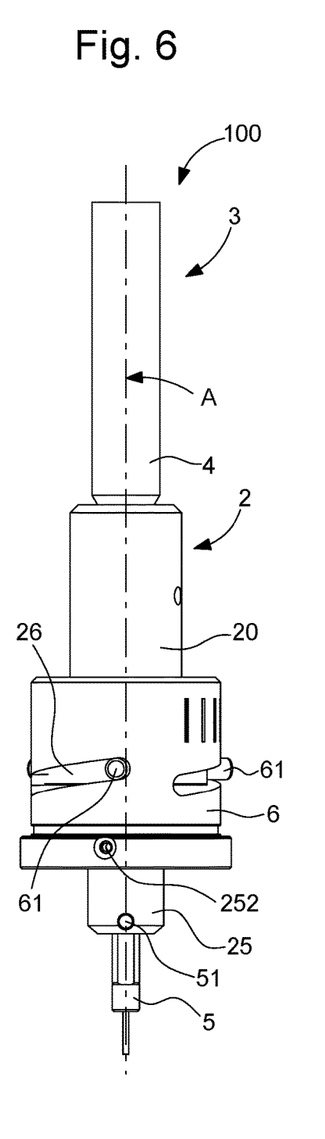
FIG. 6 shows, similarly to FIG. 4, the same measuring body without the outer ring.
Figure 7:
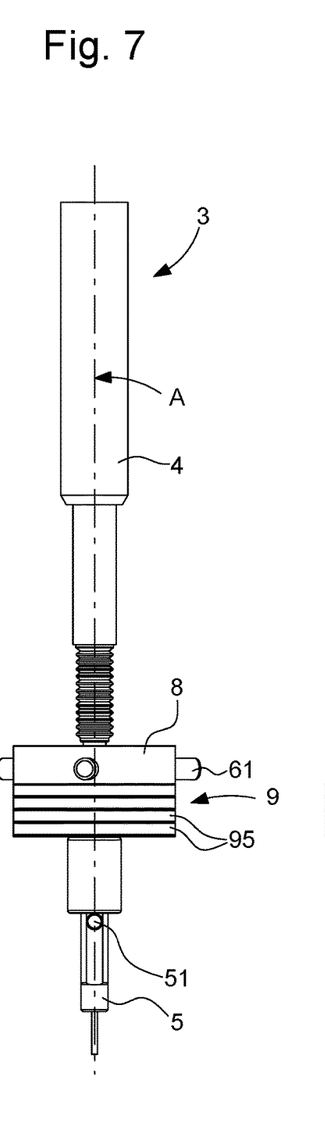
FIG. 7 shows, similarly to FIG. 6, the same measuring body without the upper body thereof; from top to bottom, it shows the feeler-spindle, the bearing ring moved by the control means, the stack of resilient elements, and the bearing and measuring point.
Figure 8:
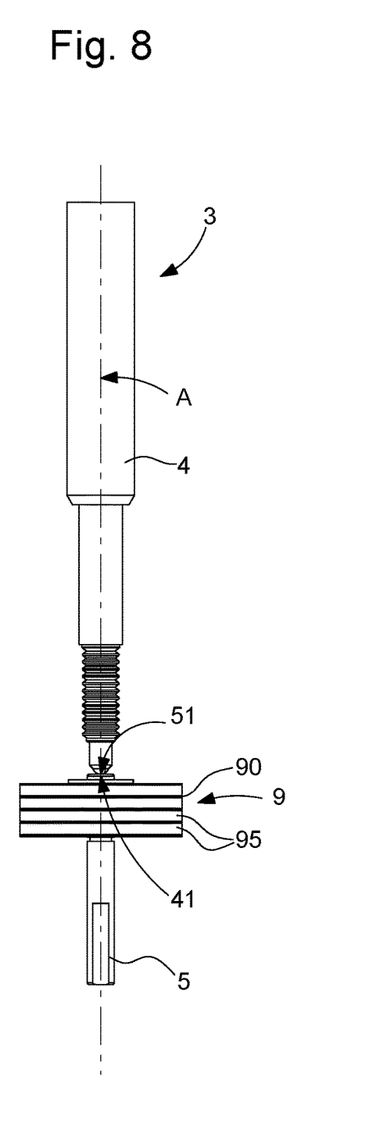
FIG. 8 shows, similarly to FIG. 7, the same measuring body without the bearing ring.
Figure 9:
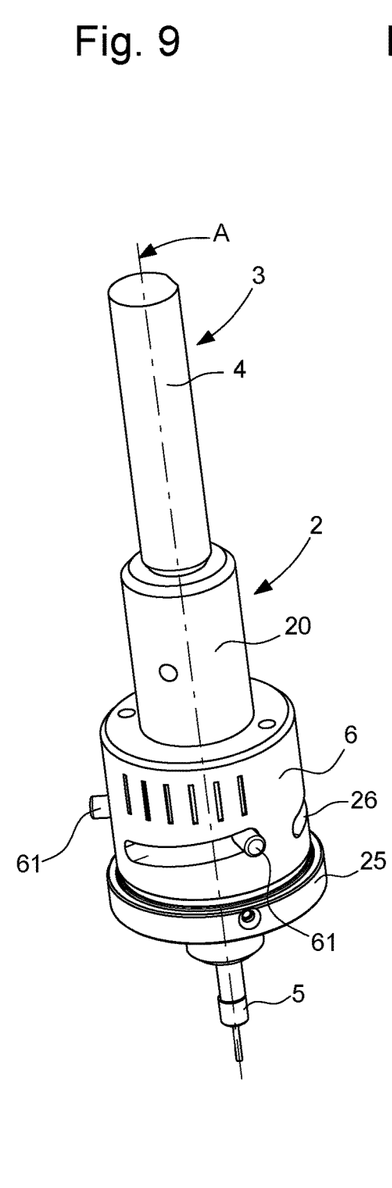
FIG. 9 diagrammatically shows a perspective view of the assembly in FIG. 6.
Figure 10:
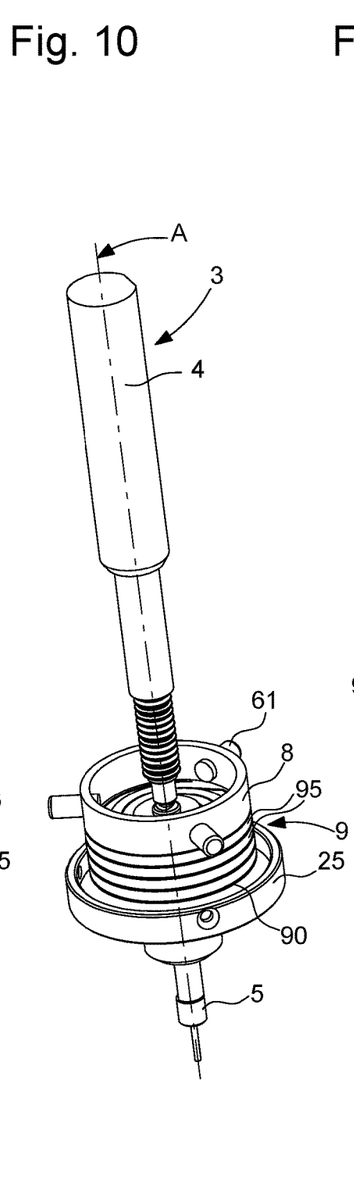
FIG. 10 diagrammatically shows a perspective view of the assembly in FIG. 7, showing an alternating stack of such resilient elements and intermediate rings.
Figure 11:
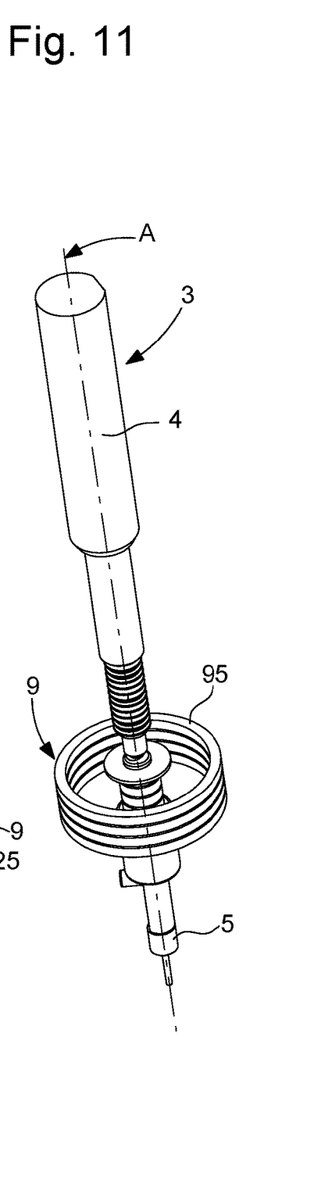
FIG. 11 diagrammatically shows a perspective view of the assembly in FIG. 8, with the upper resilient ring not being shown, and only the upper intermediate ring being visible.

According to an advantageous feature of the invention, the axial resilient return means 9 includes at least one resilient element 90, which is in particular substantially planar, and includes a peripheral felloe 91 carrying at least one spirally-wound arm 93 carrying a central ring 92, as shown in FIG. 3. More particularly, this resilient element 90 is made of spring steel of the type XC80 or the like. The production of such resilient elements 90 with the same planform geometry allows them to be made interchangeable. The choice of different thicknesses allows them to have a variety of stress characteristics. For example, for the same planform geometry, a 0.1 mm thick element can correspond to a force of 5 N, a 0.2 mm thick element to a force of 7.5 N, a 0.3 mm thick element to a force of 12.5 N, a 0.4 mm thick element to a force of 15 N, a 0.5 mm thick element to a force of 17.5 N, and a 0.6 mm thick element to a force of 20 N, or the like. Each resilient element 90 is characterised by an applied axial force/stroke characteristic curve, and it is easy to determine the characteristic curve of a stack of such resilient elements 90 of similar behaviour. For example, the figures illustrate the achievement of a maximum axial force of 40 N with the use of three 0.5 mm thick resilient elements 90, and one 0.2 mm thick resilient element 90, with the same projective geometry, which facilitates the manufacture thereof at a low production cost. Moreover, the combination of different thicknesses also allows them to have a variety of stress characteristics. For example, for a set of resilient elements formed by three 0.5 mm thick elements and one 0.2 mm thick element, an axial displacement of 1 mm of this set can correspond to a force of 12 N, an axial displacement of 1.5 mm to a force of 19 N, an axial displacement of 2 mm to a force of 26 N, an axial displacement of 2.5 mm to a force of 33 N, and an axial displacement of 3 mm to a force of 40 N, or the like.

Figure 12:
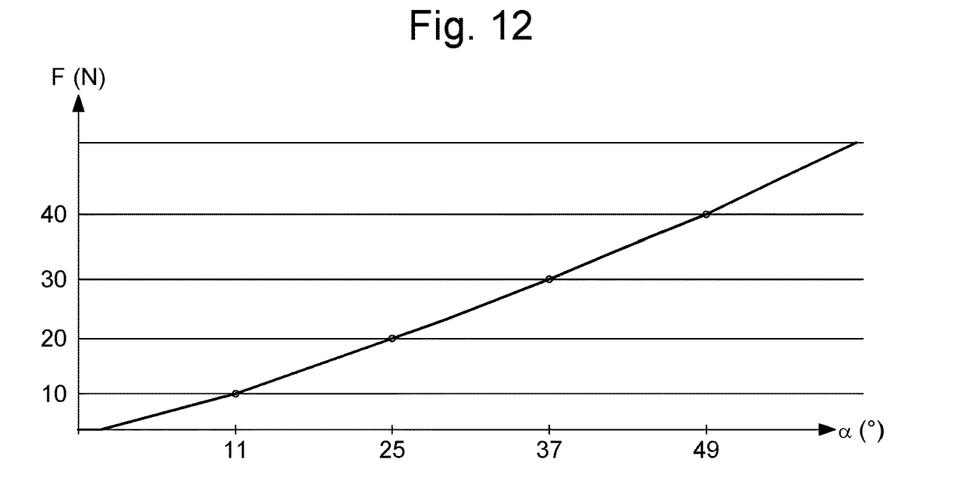
FIG. 12 is an example of a force/stroke characteristic curve of a resilient element or a stack of resilient elements: known stroke values precisely determine predetermined axial force values.

FIG. 12 shows one example of a characteristic curve for a resilient return means 9 calibrated at 40 N, and this curve can be seen to be near-linear. This curve is exaggeratedly distorted here, as the characteristic of a resilient element 90 according to FIG. 3 is seen to be near-linear in the range of use thereof. However, it is clear that, even if the characteristic curve is not linear, what is important is the reproducibility thereof, when it comes to defining discrete axial stroke values that guarantee known force values. Moreover, specific strokes, identified by a marking, a notch or the like, correspond to well-defined force values, as in this example an angle 11°/force 10 N, angle 25°/force 20 N, angle 37°/force 30 N, and angle 49°/force 40 N. It goes without saying that such a resilient element 90 is not necessarily planar, as in the case of Belleville or Schnorr washers which have a conical geometry, but it should be noted that the forces applied here are very low, and a planar geometry is far more advantageous, as it guarantees manufacturing reproducibility much better than a non-planar or conical spring washer. Moreover, the deviations from the planar rest position are also very low, in the order of a tenth of a millimetre or a millimetre for resilient elements 90 with an outside diameter of 30 mm and an inside diameter of 5 mm as used in the non-limiting device illustrated in the figures.

Thus, more particularly, the axial resilient return means 9 includes a stack of a plurality of such resilient elements 90, each of which is calibrated for a specific nominal axial force, and the resultant whereof determines the maximum axial calibration of the device 100.

Advantageously, this stack is an alternating stack of such resilient elements 90 and of intermediate rings 95, which are arranged to avoid any contact between the arms 93 of adjacent resilient elements 90. In a specific and non-limiting manner, this stack further includes, at the top, a retaining ring 99 cooperating with a groove 599 in the central shaft 59, and which holds the assembly formed by the resilient elements 90 alternating with the intermediate rings 95 (the latter being in particular made of brass); towards the bottom, another retaining ring can be housed inside another groove to serve simply as a travel stop and, above all, to facilitate assembly, without exerting stress on the assembly of the resilient elements 90 and intermediate rings 95, because this assembly must be free on the lower side in order to be able to apply the bearing force.

In a composition as illustrated in the figures, the device 100 includes a plurality of such resilient elements 90, all of which are interchangeable, and each of which is associated with a force-stroke characteristic curve, accessible to the user and/or stored in a management means capable of determining a stacking composition as a function of the resulting force to be applied, and the rotational or axial strokes to be applied to the control means 6 for obtaining a given axial force. The user can thus be sure of the actual force applied to the surface 10.

Different arrangements are possible. In one alternative embodiment, the axial resilient return means 9 includes at least one resilient element 90 that can be axially deformed between a first rigid part that bears in abutment against at least one banking surface 21, 251 comprised in the body 2, and a second rigid part that is subjected to the thrust action exerted by at least one thrust surface 81, 89 comprised in the bearing ring 8. In another alternative embodiment, the axial resilient return means 9 includes at least one resilient element 90 that can be axially deformed between a first rigid part that bears in abutment against at least one banking surface 21, 251 comprised in said body 2, and a second rigid part that is integral with the bearing ring 8.

In order to more easily maintain and exchange the resilient elements, the body 2 is advantageously made of at least two parts assembled to one another, an upper part 20 arranged to cooperate with the control means 6 and enclosing the feeler-spindle 4, and a lower part 25 carrying the bearing and measuring point 5. Pinning means 252, 51 allow for easy disassembly of the various components.

The feeler-spindle 4 cooperates with a rigid punch 59, which is housed inside a bearing block or bearing 58, and which presses on the insert to be tested at the surface 10 via the preferably interchangeable bearing and measuring point 5. When a force is applied, the displacement of the surface 10 is immediately measured. The feeler-spindle is set without play on the surface 10 to be tested, it is thus sufficient to set the zero point of the display; a predefined force is then applied by rotating the control means 6 according to a graduation, which is not necessarily even, and which is derived from the force/stroke characteristic of the resilient elements 90 that form the resilient return means 9 of the device 100 in its current composition.

More particularly, at least one control means 6 includes a notch and/or bankings for limiting the stroke.

Figures 14, 15:
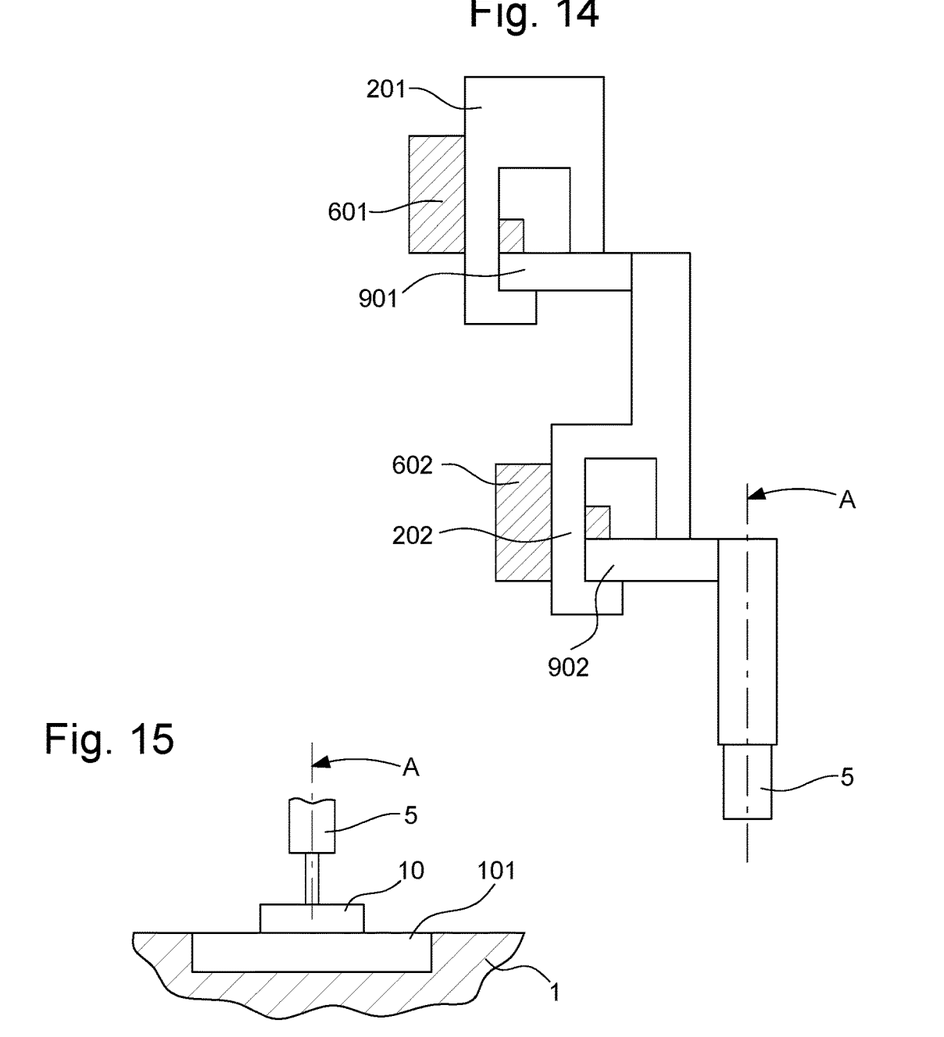
FIG. 14 diagrammatically shows a sectional view of a measuring body including two stages in series, with an upper stage for applying a greater force than that applied by the lower stage for fine adjustment.
FIG. 15 diagrammatically shows a sectional view of a table of the device, which includes a force sensor disposed beneath the component for digitally measuring the axial force applied thereto.

In one specific embodiment, briefly shown in FIG. 14, the device 100 includes a stacking of separate control means 6 in series: an upper control means 601 cooperating with an upper body 201 and an upper resilient return means 901, and a lower control means 602 cooperating with a lower body 202 and a lower resilient return means 902, each corresponding to a specific range of applied force, in order to apply, to a surface 10, a first axial force in a first range of forces, and then at least a second axial force that is lower than the first axial force in a second range of forces that is lower than the first range of forces.

More particularly, the device 100 includes, in particular at the upper body 20, an upper banking 29 for resetting the stroke, by bringing the resilient elements 90 into an undeformed rest position. More particularly again, this upper banking 29 includes at least one protective and sealing gasket, of the O-ring or a similar type.

Figure 16:
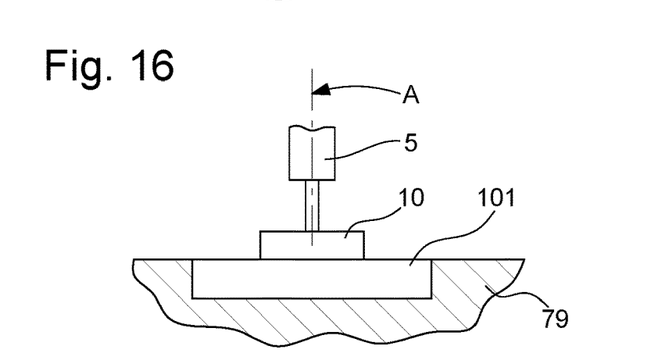
FIG. 16 shows, similarly to FIG. 15, a workholding pallet that includes such a force sensor.

In the alternative embodiments in FIGS. 15 and 16, the support 1 of the device 100 includes at least one table or pallet 79 for receiving at least one component, which table or pallet 79 includes a force sensor 101 disposed beneath the component for digitally measuring the axial force applied thereto.

The invention relates to the field of horological precision, and thus concerns the ability to measure very small deviations, in the micrometric range. To this end, the device 100 must be as rigid as possible, while retaining small outer dimensions, and of a mass that allows it to be manually displaced from one workstation to another.

Figure 1:
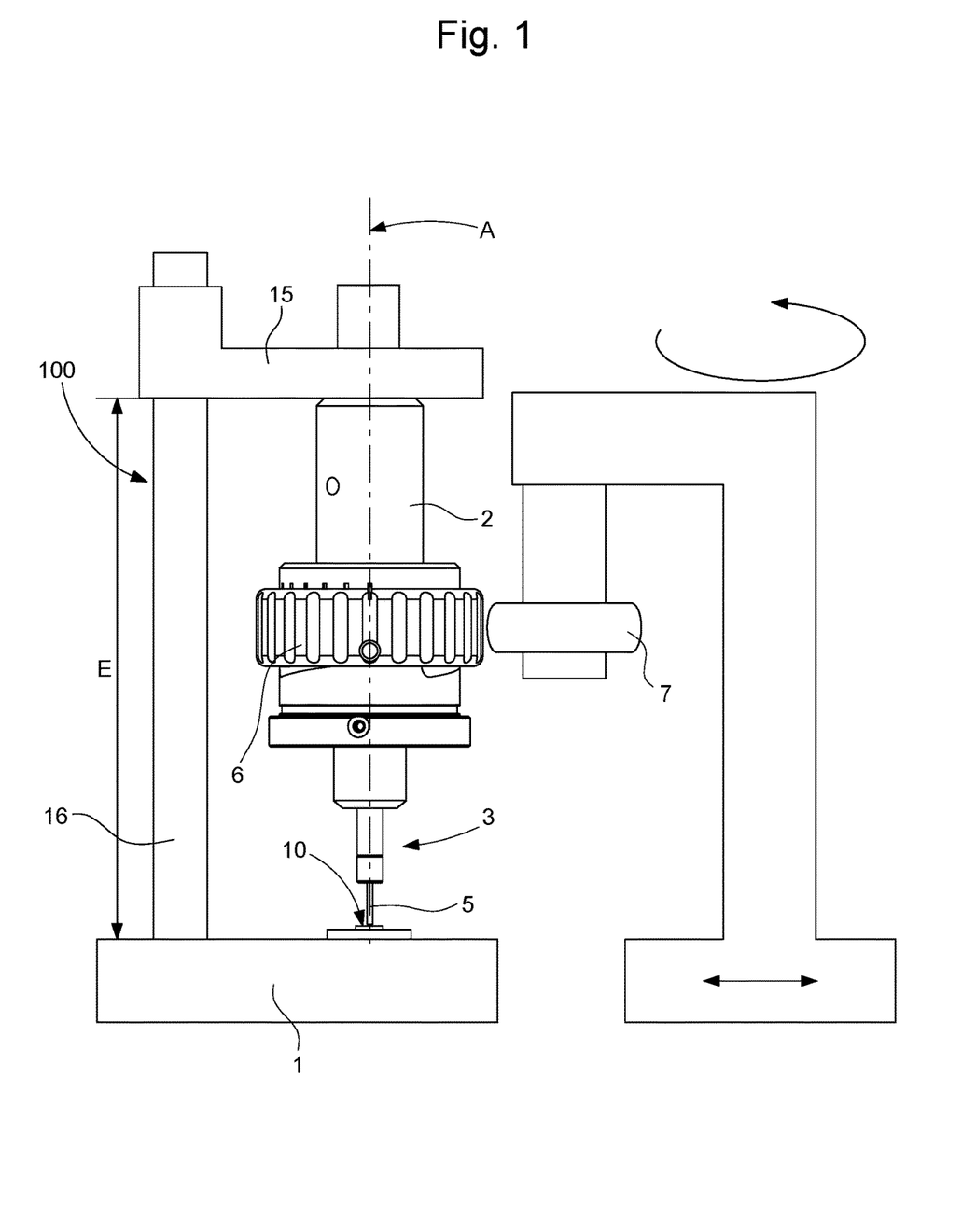
FIG. 1 diagrammatically shows an elevation view of a device according to the invention, including a rigid frame with a table for receiving a timepiece component, a column and a support carrying a measuring body which integrates a distance-measuring feeler-spindle, and which includes a control means, in this case formed by a fluted ring, which is arranged to be operated by a user or, as in this case, by a drive roller comprised in an automated manipulator, in order to apply, to the surface of the component, a characterised axial force, transmitted to a bearing and measuring point by a resilient return means which obeys a reproducible force/stroke characteristic, and to which the control means imposes a certain stroke in order to obtain an axial force of predetermined modulus.
Figure 2:
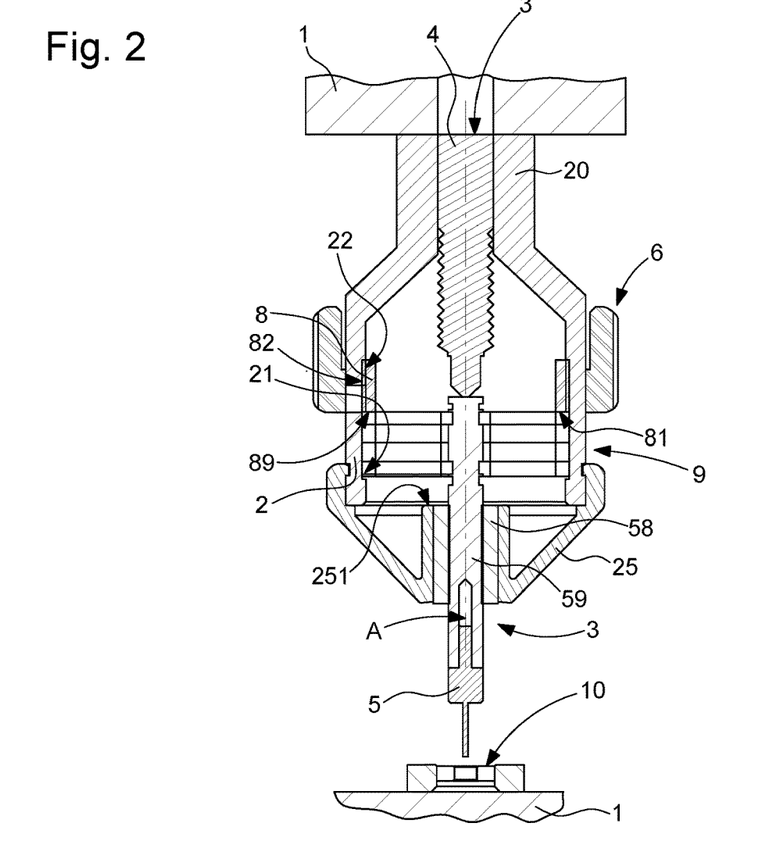
FIG. 2 diagrammatically shows a partial and axial, sectional view of a first alternative embodiment of such a device, in which the control means formed by the outer ring can be seen to drive an inner ring which deforms a stack of resilient elements, which constitutes this resilient return means for applying the axial force.
Figure 13:
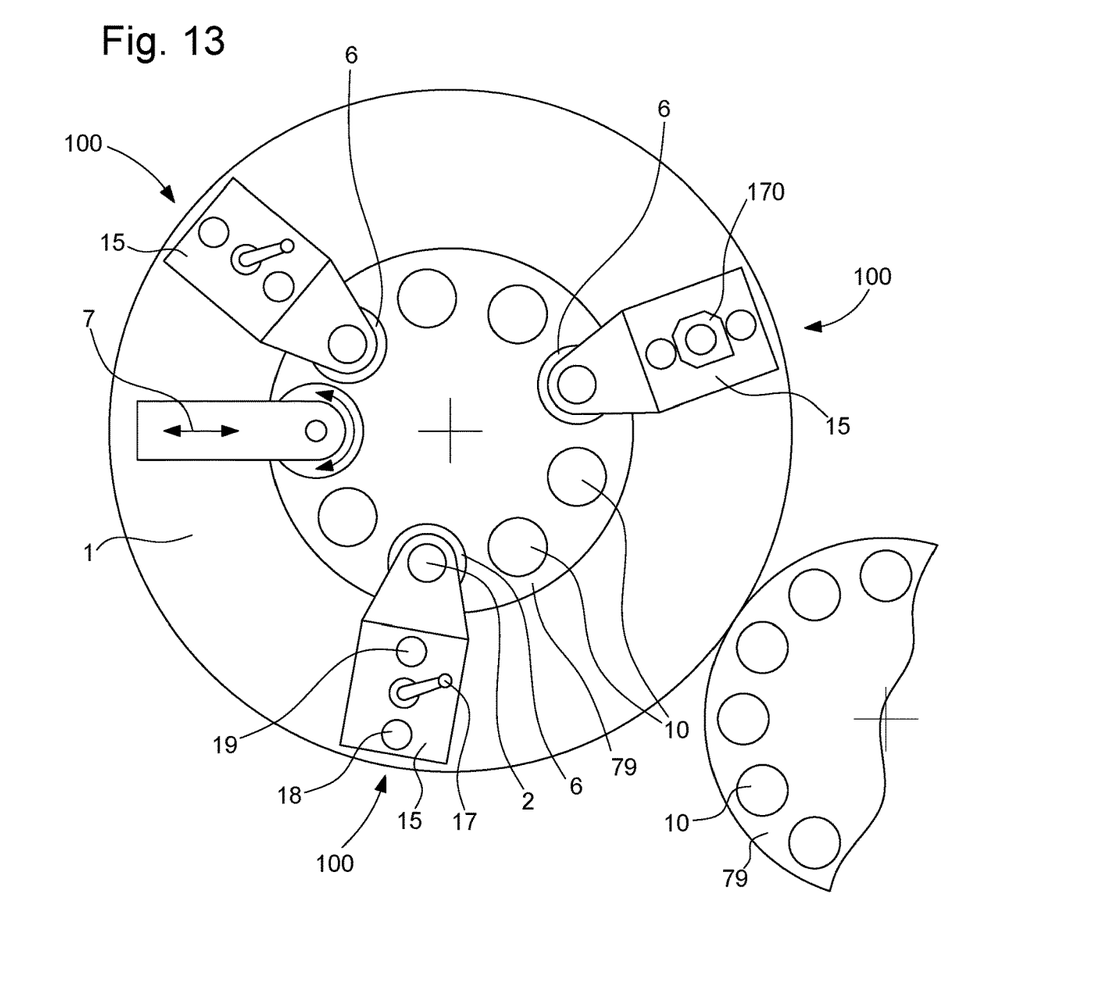
FIG. 13 diagrammatically shows a top view of a production station including three devices according to the invention, with supports that can be adjusted in height by a crank or motor, and serving circular pallets carrying the timepiece components and capable of being interchanged by a palletiser; one of the devices includes a drive roller such as that shown in FIG. 1.

The device 100 includes at least one single, large guide column 16, as shown in FIG. 1, or a plurality of columns 18, 19, as shown in FIG. 13, for guiding support elements 15 carrying measuring bodies 2, and it advantageously includes manual adjustment means 17 and/or motor-driven adjustment means 170 for making macro-adjustments to the approach of the device 100 during a production changeover, or a cam lever for rapidly changing the height of a support 15. This column 16, or these columns 18, 19, ensures or ensure the rigidity of the device 100 and the constancy of the axial distance E between each support element 15 and a table for receiving the components to be handled, during a combined force-application and measurement campaign. When the device 100 is a multi-station device as shown in FIG. 13, one of the stations can be dedicated to extraction.

In the case of mass production, the device 100 advantageously includes at least one pallet 79 for receiving the components, which is arranged for robotic handling, by a robot, a rotary or linear palletiser, or the like.

For use without an operator, or if the same operator manages a plurality of such devices 100 simultaneously, at least one device 100 includes at least one automated manipulator 7, including a roller, a belt, a drive wheel, or the like, for controlling an angular stroke of rotation of at least one control means 6. This automated manipulator 7 can be coupled with a viewing means to stop the driving motion thereof upon the synchronisation of markings comprised on the control means 6 and the body 2.

The invention further relates to a method for using such a device 100, wherein the reproducibility of the deformations of the resilient elements 90 is used to carry out force application operations which are correct from the outset and do not require subsequent verification measurements, since the device 100 measures the displacement of a surface 10 at the same time as an axial force is applied thereto. According to the invention, a plurality of such calibrated resilient elements 90 are provided, the force characteristics whereof are recorded as a function of the applied axial stroke, and a particular stack of such resilient elements 90 is characterised by the combined resultant force characteristic thereof as a function of the applied axial stroke. Moreover, this combined characteristic is used to impart to the control means 6, in a single manoeuvring operation, the rotational or axial stroke which corresponds, according to the combined characteristic, to a specific stroke in relation to the specific axial force to be applied.

More specifically, a force is applied to a surface 10 of a component and the displacement of the surface 10 is measured from the same side of the surface 10, in contrast to the prior art, where a force is commonly applied from above, and a displacement is then measured from below.

More particularly, the device 100 is used to fit a timepiece component with a jewel, whose insertion force and axial position constancy relative to this timepiece component are controlled. Such a timepiece component can, in particular, but in a non-limiting manner, be a blank such as a plate, bridge, frame, or the like, or a provision, such as a disc, rocker, intermediate wheel, or the like.

More particularly and conversely, this device 100 is used to extract a friction jewel pressed into a timepiece component with a controlled extraction force.

To summarise, to simplify the measurement of the strength of fit of jewels, the addition of a simple and intuitive actuator to the end of the feeler-spindle (distance measurement) has been conceived, in order to generate the desired force, which is derived from a set of spiral springs.

Once the end of the point of the distance measuring system is in contact with the jewel:
 the zero point is taken;
 the desired force is applied by turning the outer ring of the actuator or control means 6;
 at the same time, it is checked whether the surface 10 of the jewel has moved during the application of the axial force, and by how much.

To summarise, the invention overcomes the current difficulties thanks to the advantages it procures:
 no need to handle a timepiece component multiple times to determine the strength of fit of a jewel;
 reduced distance measurement uncertainty (moving jewel);
 reduced variability of the force applied;
 shorter measurement time;
 lower costs compared to current solutions;
 simplicity, interchangeability;
 improved measurement reliability, given that everything is integrated into a single assembly and that both the force application and distance measurement take place in the same axis.

The invention is thus particularly effective in carrying out precision pressing or precision fitting, in order to control the quality of the fit of this pressing or fitting operation. The device 100 as described is inexpensive, compact, and light enough to be transported as needed for production.

Handling is simplified as the force application step and the measuring step are combined into a single operation.

The invention claimed is:

1. A device for applying an axial force to a timepiece component, and for simultaneously measuring an axial distance between a reference and a surface of said component, said device comprising:
 a support to carry at least one measuring body which includes at least one measuring means arranged to carry out an axial measurement of a position of said surface of a timepiece component, in an axial direction, said measuring means includes a feeler-spindle in contact with a bearing and measuring point and aligned therewith in said axial direction,
 wherein said device is a combined device for simultaneously applying the force and measuring displacement of the surface to which the force is applied, and
 wherein said device includes at least one control means, which is arranged to be operated by a user or by an automated manipulator, to apply to said surface a characterised axial force transmitted to said bearing and said measuring point by at least one calibrated axial resilient return means.

2. The device according to claim 1, wherein said control means is configured to drive a bearing ring through a motion in said axial direction and to modify an axial force exerted by said bearing ring, in said axial direction on said at least one axial resilient return means, which is arranged to transmit, to said bearing and measuring point, an axial force proportional to an axial stroke of said bearing ring.

3. The device according to claim 2, wherein said control means is configured to be driven in rotation, and includes at least one driver configured to follow an oblique or substantially helical groove provided in said body and to drive said bearing ring at least in translation in said axial direction.

4. The device according to claim 2, wherein said bearing ring includes, in said axial direction, a thread, or respectively a tapping, cooperating with a tapping, or respectively a thread, comprised in said body.

5. The device according to claim 2, wherein said control means includes a tapping or respectively a thread cooperating with a thread or respectively a tapping comprised in said body.

6. The device according to claim 2, wherein said axial resilient return means includes at least one resilient element, which is substantially planar, and includes a peripheral felloe carrying at least one spirally-wound arm carrying a central ring.

7. The device according to claim 6, wherein said axial resilient return means includes a stack of a plurality of said resilient elements, each of which is calibrated for a specific nominal axial force, and the resultant whereof determines a maximum axial calibration of said device.

8. The device according to claim 7, wherein said stack is an alternating stack of said resilient elements and of intermediate rings arranged to avoid any contact between said arms of said adjacent resilient elements.

9. The device according to claim 6, wherein said device includes a plurality of said resilient elements, all of which are interchangeable, and each of which is associated with a force-stroke characteristic curve, accessible to the user and/or stored in a management means configured to determine a stacking composition as a function of the resulting force to be applied, and the rotational or axial strokes to be applied to said control means for obtaining a given axial force.

10. A method for using the device according to claim 6, comprising:
providing a plurality of said calibrated resilient elements, the force characteristics whereof are recorded as a function of the applied axial stroke,
characterizing a particular stack of said resilient elements by the combined resultant force characteristic thereof as a function of the applied axial stroke, and
using said combined characteristic to impart to said control means the rotational or axial stroke which corresponds, according to said combined characteristic, to a specific stroke in relation to the specific axial force to be applied.

11. The method according to claim 10, further comprising:
applying said force to said surface of said component and measuring the displacement of said surface from the same side of said surface.

12. The method according to claim 10, wherein said device is used to fit a timepiece component with a jewel, whose insertion force and axial position constancy relative to said timepiece component are controlled.

13. The method according to claim 10, wherein said device is used to extract a friction jewel pressed into a timepiece component with a controlled extraction force.

14. The device according to claim 2, wherein said axial resilient return means includes at least one resilient element that can be axially deformed between a first rigid part that bears in abutment against at least one banking surface comprised in said body, and a second rigid part subjected to a thrust action exerted by at least one thrust surface comprised in said bearing ring.

15. The device according to claim 2, wherein said axial resilient return means includes at least one resilient element that can be axially deformed between a first rigid part that bears in abutment against at least one banking surface comprised in said body, and a second rigid part that is integral with said bearing ring.

16. The device according to claim 1, wherein said body is made of at least two parts assembled to one another, an upper part arranged to cooperate with said control means and enclosing said feeler-spindle, and a lower part carrying said bearing and measuring point.

17. The device according to claim 1, wherein said at least one control means includes a notch and/or bankings for limiting the stroke.

18. The device according to claim 1, wherein said device includes a stacking in series of said separate control means, each corresponding to a specific range of applied force, in order to apply, to said surface, a first axial force in a first range of forces, and then at least a second axial force that is lower than said first axial force in a second range of forces that is lower than said first range of forces.

19. The device according to claim 1, wherein said device includes an upper banking for resetting the stroke.

20. The device according to claim 19, wherein said upper banking includes at least one protective and sealing gasket.

21. The device according to claim 1, wherein said support of said device includes at least one table or pallet to receive at least one said component, which table or pallet includes a force sensor disposed beneath said component to digitally measure the axial force applied thereto.

22. The device according to claim 1, wherein said device includes a plurality of columns to guide support elements for said bodies, and manual adjustment means and/or motor-driven adjustment means for making macro-adjustments to said device during a production changeover, and said columns ensure a rigidity of said device and a constancy of the axial distance between each said support element and a table to receive the components to be handled, during a combined force-application and measurement campaign.

23. The device according to claim 1, wherein said device includes at least one pallet to receive said components and which is arranged for robotic handling.

24. The device according to claim 1, wherein said device includes at least one automated manipulator including a roller, a belt or a drive wheel to control an angular stroke of rotation of at least one said control means.

* * * * *